United States Patent
Kohlenberg et al.

(10) Patent No.: US 9,494,084 B2
(45) Date of Patent: Nov. 15, 2016

(54) GAS TURBINE ENGINE WITH FAN VARIABLE AREA NOZZLE FOR LOW FAN PRESSURE RATIO

(75) Inventors: Gregory A. Kohlenberg, Kensington, CT (US); Sean P. Zamora, Coventry, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 50 days.

(21) Appl. No.: 13/340,810

(22) Filed: Dec. 30, 2011

(65) Prior Publication Data

US 2013/0145745 A1 Jun. 13, 2013
US 2016/0010565 A9 Jan. 14, 2016

Related U.S. Application Data

(63) Continuation-in-part of application No. 13/314,365, filed on Dec. 8, 2011, which is a continuation of application No. 11/843,675, filed on Aug. 23, 2007, now Pat. No. 8,074,440.

(51) Int. Cl.

| F02K 1/00 | (2006.01) |
|---|---|
| F02C 9/20 | (2006.01) |
| B64D 33/04 | (2006.01) |
| F02K 1/30 | (2006.01) |
| F02K 1/72 | (2006.01) |
| F01D 5/02 | (2006.01) |
| F01D 15/12 | (2006.01) |
| F01D 17/14 | (2006.01) |
| F01D 25/24 | (2006.01) |
| F02C 3/04 | (2006.01) |
| F02C 9/18 | (2006.01) |

(52) U.S. Cl.
CPC ............... *F02C 9/20* (2013.01); *B64D 33/04* (2013.01); *F01D 5/02* (2013.01); *F01D 15/12* (2013.01); *F01D 17/14* (2013.01); *F01D 25/24* (2013.01); *F02C 3/04* (2013.01); *F02C 9/18* (2013.01); *F02K 1/30* (2013.01); *F02K 1/72* (2013.01); *F05D 2220/32* (2013.01); *F05D 2240/128* (2013.01); *F05D 2270/3015* (2013.01)

(58) Field of Classification Search
CPC ........... B64D 33/04; F02K 1/30; F02K 1/72; F05D 70/3015
USPC ...................... 60/770, 771, 265.35
See application file for complete search history.

(56) References Cited

U.S. PATENT DOCUMENTS

| 3,287,906 A | 11/1966 | McCormick |
| 3,747,343 A | 7/1973 | Rosen |

(Continued)

FOREIGN PATENT DOCUMENTS

| EP | 1340903 A2 | 9/2003 |
| EP | 1522710 A2 | 4/2005 |

(Continued)

OTHER PUBLICATIONS

Jacobs, Eastman N., "The Characteristics of 78 Related Airfoil Sections from Tests in the Variable-Density Wind Tunnel," National Advisory Committee for Aeronautics, Nov. 1933, pp. 2-61.

(Continued)

*Primary Examiner* — Jesse Bogue
(74) *Attorney, Agent, or Firm* — Carlson, Gaskey & Olds, P.C.

(57) ABSTRACT

A gas turbine engine includes a fan section with twenty (20) or less fan blades and a fan pressure ratio less than about 1.45.

13 Claims, 8 Drawing Sheets

(56) References Cited

U.S. PATENT DOCUMENTS

| | | | |
|---|---|---|---|
| 3,754,484 A | 8/1973 | Roberts | |
| 3,779,010 A | 12/1973 | Chamay et al. | |
| 3,820,719 A | 6/1974 | Clark | |
| 3,892,358 A | 7/1975 | Gisslen | |
| 4,054,030 A | 10/1977 | Pedersen | |
| 4,086,761 A | 5/1978 | Schaut et al. | |
| 4,130,872 A | 12/1978 | Harloff | |
| 4,137,708 A | 2/1979 | Aspinwall et al. | |
| 4,327,548 A | 5/1982 | Woodward | |
| 4,922,713 A | 5/1990 | Barbarin et al. | |
| 5,169,288 A | 12/1992 | Gliebe et al. | |
| 5,433,674 A | 7/1995 | Sheridan et al. | |
| 5,447,411 A | 9/1995 | Curley et al. | |
| 5,524,847 A | 6/1996 | Brodell et al. | |
| 5,577,381 A | 11/1996 | Eigenbrode et al. | |
| 5,586,431 A | 12/1996 | Thonebe et al. | |
| 5,593,112 A | 1/1997 | Maier et al. | |
| 5,655,360 A | 8/1997 | Butler | |
| 5,778,659 A | 7/1998 | Duesler et al. | |
| 5,806,302 A | 9/1998 | Cariola et al. | |
| 5,833,140 A | 11/1998 | Loffredo et al. | |
| 5,853,148 A | 12/1998 | Standish et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,158,210 A | 12/2000 | Orlando | |
| 6,223,616 B1 | 5/2001 | Sheridan | |
| 6,318,070 B1 | 11/2001 | Rey et al. | |
| 6,378,293 B1 | 4/2002 | Care et al. | |
| 6,619,030 B1 | 9/2003 | Seda et al. | |
| 6,622,473 B2 | 9/2003 | Becquerelle et al. | |
| 6,732,502 B2 | 5/2004 | Seda et al. | |
| 6,814,541 B2 | 11/2004 | Evans et al. | |
| 6,971,229 B2* | 12/2005 | Lair | F02K 1/06 181/220 |
| 7,021,042 B2 | 4/2006 | Law | |
| 7,374,403 B2* | 5/2008 | Decker et al. | 416/223 R |
| 7,591,754 B2 | 9/2009 | Duong et al. | |
| 7,824,305 B2 | 11/2010 | Duong et al. | |
| 7,870,722 B2* | 1/2011 | Birch et al. | 60/226.1 |
| 7,926,260 B2 | 4/2011 | Sheridan et al. | |
| 7,950,237 B2* | 5/2011 | Grabowski | F01D 21/04 60/226.1 |
| 8,205,432 B2 | 6/2012 | Sheridan | |
| 8,997,497 B2* | 4/2015 | Hall | B64D 33/04 239/265.19 |
| 2002/0069637 A1 | 6/2002 | Becquerelle et al. | |
| 2003/0163984 A1 | 9/2003 | Seda et al. | |
| 2005/0229585 A1 | 10/2005 | Webster | |
| 2005/0286823 A1 | 12/2005 | Singh et al. | |
| 2006/0101807 A1 | 5/2006 | Wood et al. | |
| 2006/0179818 A1* | 8/2006 | Merchant | 60/226.1 |
| 2006/0228206 A1* | 10/2006 | Decker | F01D 5/141 415/1 |
| 2008/0010929 A1 | 1/2008 | Moriau et al. | |
| 2008/0010969 A1 | 1/2008 | Hauer et al. | |
| 2008/0098716 A1 | 5/2008 | Orlando et al. | |
| 2008/0317588 A1 | 12/2008 | Grabowski et al. | |
| 2009/0053058 A1* | 2/2009 | Kohlenberg et al. | 415/227 |
| 2009/0097967 A1 | 4/2009 | Smith et al. | |
| 2009/0208328 A1 | 8/2009 | Stern | |
| 2009/0226303 A1 | 9/2009 | Grabowski et al. | |
| 2009/0277155 A1 | 11/2009 | Bulin et al. | |
| 2009/0320488 A1* | 12/2009 | Gilson et al. | 60/771 |
| 2010/0008764 A1 | 1/2010 | Baltas et al. | |
| 2010/0043393 A1 | 2/2010 | Zamora et al. | |
| 2010/0044503 A1 | 2/2010 | Bulin et al. | |
| 2010/0064659 A1* | 3/2010 | Wang | F02K 1/09 60/226.2 |
| 2010/0148396 A1 | 6/2010 | Xie et al. | |
| 2010/0331139 A1 | 12/2010 | McCune | |
| 2011/0004388 A1 | 1/2011 | Winter | |
| 2011/0120078 A1 | 5/2011 | Schwark, Jr. et al. | |
| 2011/0120080 A1 | 5/2011 | Schwark, Jr. et al. | |
| 2011/0296813 A1 | 12/2011 | Frank et al. | |
| 2011/0302907 A1 | 12/2011 | Murphy | |

FOREIGN PATENT DOCUMENTS

| | | |
|---|---|---|
| EP | 1967701 A2 | 9/2008 |
| EP | 2028359 A2 | 2/2009 |
| EP | 2138696 A1 | 12/2009 |
| EP | 2157305 A2 | 2/2010 |
| EP | 2184480 A2 | 5/2010 |
| EP | 2282016 A2 | 2/2011 |
| EP | 2584184 A2 | 4/2013 |
| FR | 1503425 | 3/1978 |
| GB | 1516041 | 6/1978 |
| GB | 2041090 | 9/1980 |
| GB | 2189550 | 10/1987 |
| WO | 2007038674 | 4/2007 |
| WO | 2008/045049 A1 | 4/2008 |
| WO | 2008/045058 A1 | 4/2008 |

OTHER PUBLICATIONS

International Search Report & Written Opinion for International Application No. PCT/US2012/068336 mailed Jun. 27, 2013.
International Search Report & Written Opinion for International Application No. PCT/US2012/071954 mailed Jul. 29, 2013.
International Preliminary Report on Patentability for International Application No. PCT/US2012/068336 mailed Jun. 19, 2014.
International Preliminary Report on Patentability for International Application No. PCT/US2012/071928 mailed Jul. 10, 2014.
International Preliminary Report on Patentability for International Application No. PCT/US2012/071937 mailed Jul. 10, 2014.
International Preliminary Report on Patentability for International Application No. PCT/US2012/071946 mailed Jul. 10, 2014.
International Preliminary Report on Patentability for International Application No. PCT/US2012/071954 mailed Jul. 10, 2014.
International Search Report and Written Opinion for International Application No. PCT/US2012/071937 completed on Aug. 16, 2013.
Guha. Optimum Fan Pressure Ratio for Bypass Engines with Separate or Mixed Exhaust Streams. Journal of Propulsion and Power, vol. 17, No. 5. Sep.-Oct. 2001 [retrieved on Aug. 21, 2013]. Retrieved from the Internet: <URL: http://www.facweb.iitkgp,ernet. in/~aguha/research/AIAA2001.pdf>entire document.
International Search Report and Written Opinion for International Application No. PCT/US2012/071946 completed on Aug. 21, 2013.
International Search Report and Written Opinion for International Application No. PCT/US2012/071928 completed on Aug. 20, 2013.
Search Report and Written Opinion for Singapore Application No. 11201403587S dated Mar. 10, 2015.
Search Report and Written Opinion for Singapore Application No. 11201403586Q dated Mar. 10, 2015.
Search Report and Written Opinion for Singapore Application No. 11201403544T dated Mar. 19, 2015.
Search Report and Written Opinion for Singapore Application No. 11201403545S dated Mar. 19, 2015.
Boggia, S. et al., Intercooled Recuperated Gas Turbine Engine Concept, AIAA 2005-4192, 2005, pp. 1-11.
European Search Report for EP Application No. 12869088.0 dated Jul. 23, 2015.
European Search Report for EP Application No. 12872220.4 dated Jul. 22, 2015.
European Search Report for EP Application No. 12871636.2 dated Jul. 23, 2015.
Search Report and Written Opinion for Singapore Application No. 11201402854V dated Oct. 2, 2015.
European Search Report for EP Application No. 12872986.0 dated Jun. 22, 2015.
European Search Report for EP Application No. 12871743.6 dated Jul. 14, 2015.

* cited by examiner

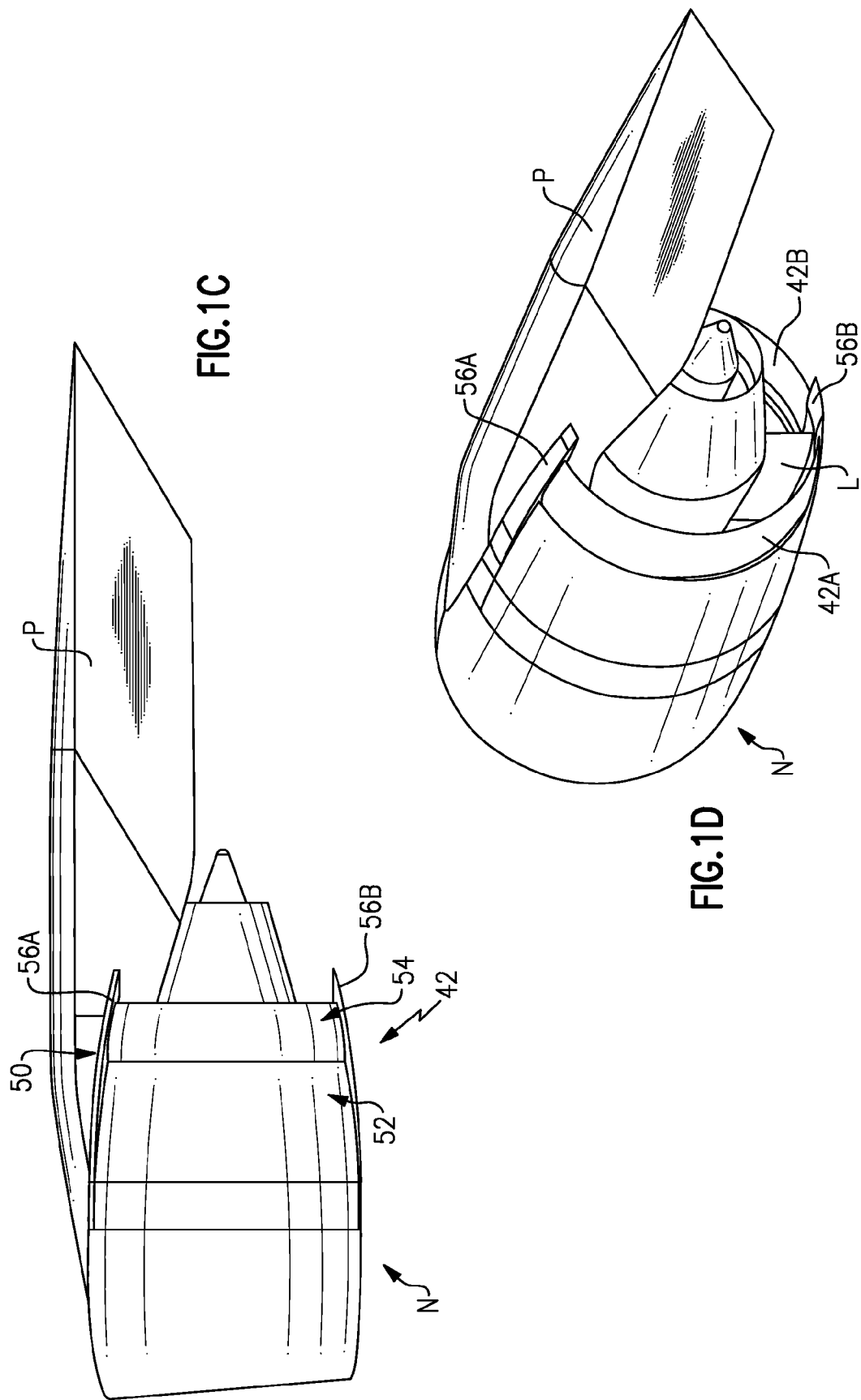

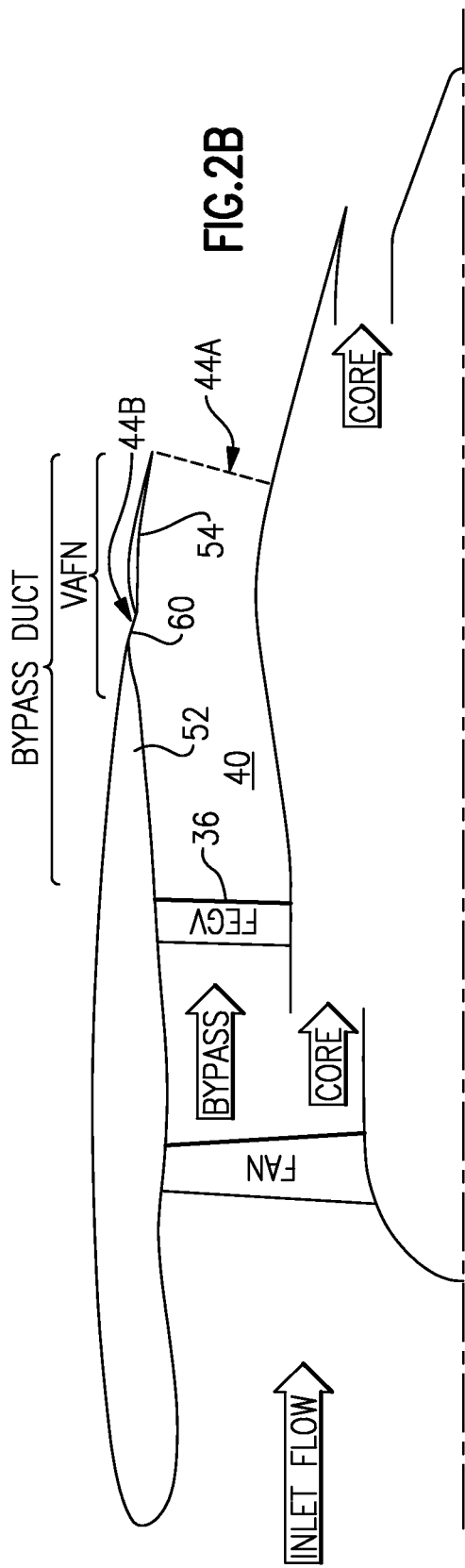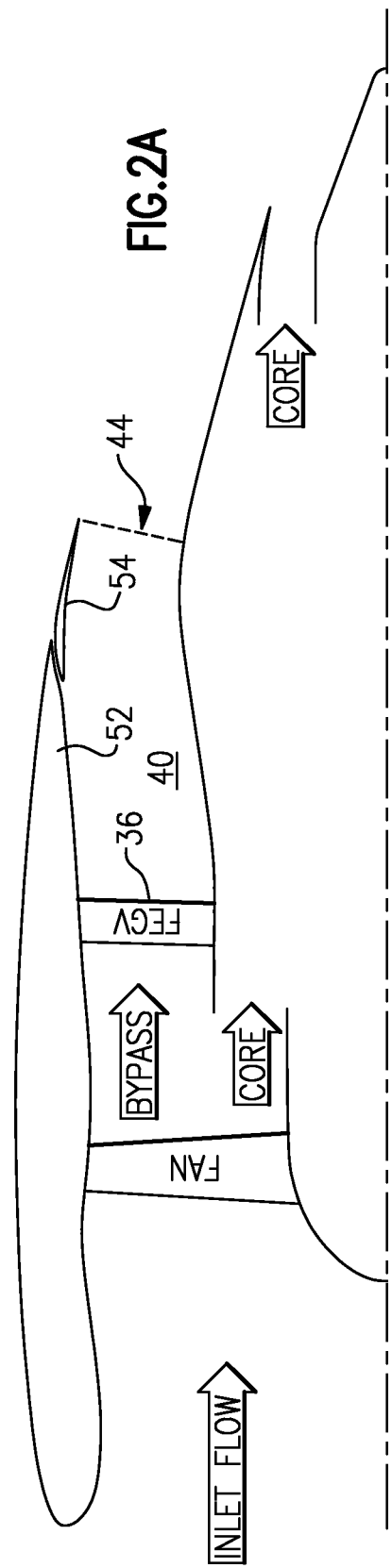

GAS TURBINE ENGINE WITH FAN VARIABLE AREA NOZZLE FOR LOW FAN PRESSURE RATIO

CROSS REFERENCE TO RELATED APPLICATIONS

The present disclosure is a continuation in part of U.S. patent application Ser. No. 13/314,365, filed Dec. 8, 2011, which is a continuation in part of U.S. patent application Ser. No. 11/843,675 filed Aug. 23, 2007 now U.S. Pat. No. 8,074,440.

BACKGROUND

The present invention relates to a gas turbine engine, and more particularly to a turbofan engine having a fan variable area nozzle (VAFN) which moves axially to change a bypass flow path area thereof.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

SUMMARY

A gas turbine engine according to an exemplary aspect of the present disclosure includes a core nacelle defined about an engine centerline axis, a fan section with twenty (20) or less fan blades, a fan nacelle mounted at least partially around the fan section and the core nacelle to define a fan bypass flow path for a fan bypass airflow, the fan bypass airflow having a fan pressure ratio of the fan bypass airflow during engine operation, the fan pressure ratio less than about 1.45.

In a further non-limiting embodiment of any of the foregoing gas turbine engine embodiments, the engine may further comprise a fan variable area nozzle movable relative to the fan nacelle to vary a fan nozzle exit area.

In a further non-limiting embodiment of any of the foregoing gas turbine engine embodiments, the engine may further comprise a controller operable to reduce the fan nozzle exit area at a cruise flight condition. Additionally or alternatively, the controller may be operable to control the fan nozzle exit area to reduce a fan instability.

In a further non-limiting embodiment of any of the foregoing gas turbine engine embodiments, the fan variable area nozzle defines a trailing edge of the fan nacelle.

In a further non-limiting embodiment of any of the foregoing gas turbine engine embodiments, the fan variable area nozzle may be axially movable relative to the fan nacelle.

In a further non-limiting embodiment of any of the foregoing gas turbine engine embodiments, the engine may further comprise a gear system driven by a core engine within the core nacelle to drive the fan section.

In a further non-limiting embodiment of any of the foregoing gas turbine engine embodiments, the fan section may define a corrected fan tip speed less than about 1150 ft/second.

In a further non-limiting embodiment of any of the foregoing gas turbine engine embodiments, the core engine may include a low pressure turbine which defines a pressure ratio that is greater than about five (5). Additionally or alternatively, the core engine may include a low pressure turbine which defines a pressure ratio that is greater than five (5).

In a further non-limiting embodiment of any of the foregoing gas turbine engine embodiments, the engine may further comprise a gear system driven by a core engine within the core nacelle to drive the fan section within the fan nacelle, the gear system defines a gear reduction ratio of greater than or equal to about 2.3.

In a further non-limiting embodiment of any of the foregoing gas turbine engine embodiments, the engine may further comprise a gear system driven by a core engine within the core nacelle to drive the fan within the fan nacelle, the gear system defines a gear reduction ratio of greater than or equal to about 2.5.

In a further non-limiting embodiment of any of the foregoing gas turbine engine embodiments, the engine may further comprise a gear system driven by a core engine within the core nacelle to drive the fan within said fan nacelle, the gear system defines a gear reduction ration of greater than or equal to 2.5.

In a further non-limiting embodiment of any of the foregoing gas turbine engine embodiments, the fan bypass airflow may define a bypass ratio greater than about six (6). Additionally or alternatively, the fan bypass airflow may define a bypass ratio greater than about ten (10). Additionally or alternatively, the bypass flow may define a bypass ratio greater than ten (10).

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1C is a side view of the engine integrated with a pylon;

FIG. 1D is a perspective view of the engine integrated with a pylon;

FIG. 2A is a sectional side view of the VAFN in a closed position;

FIG. 2B is a sectional side view of the VAFN in an open position; and

DETAILED DESCRIPTION

Figure 1A:
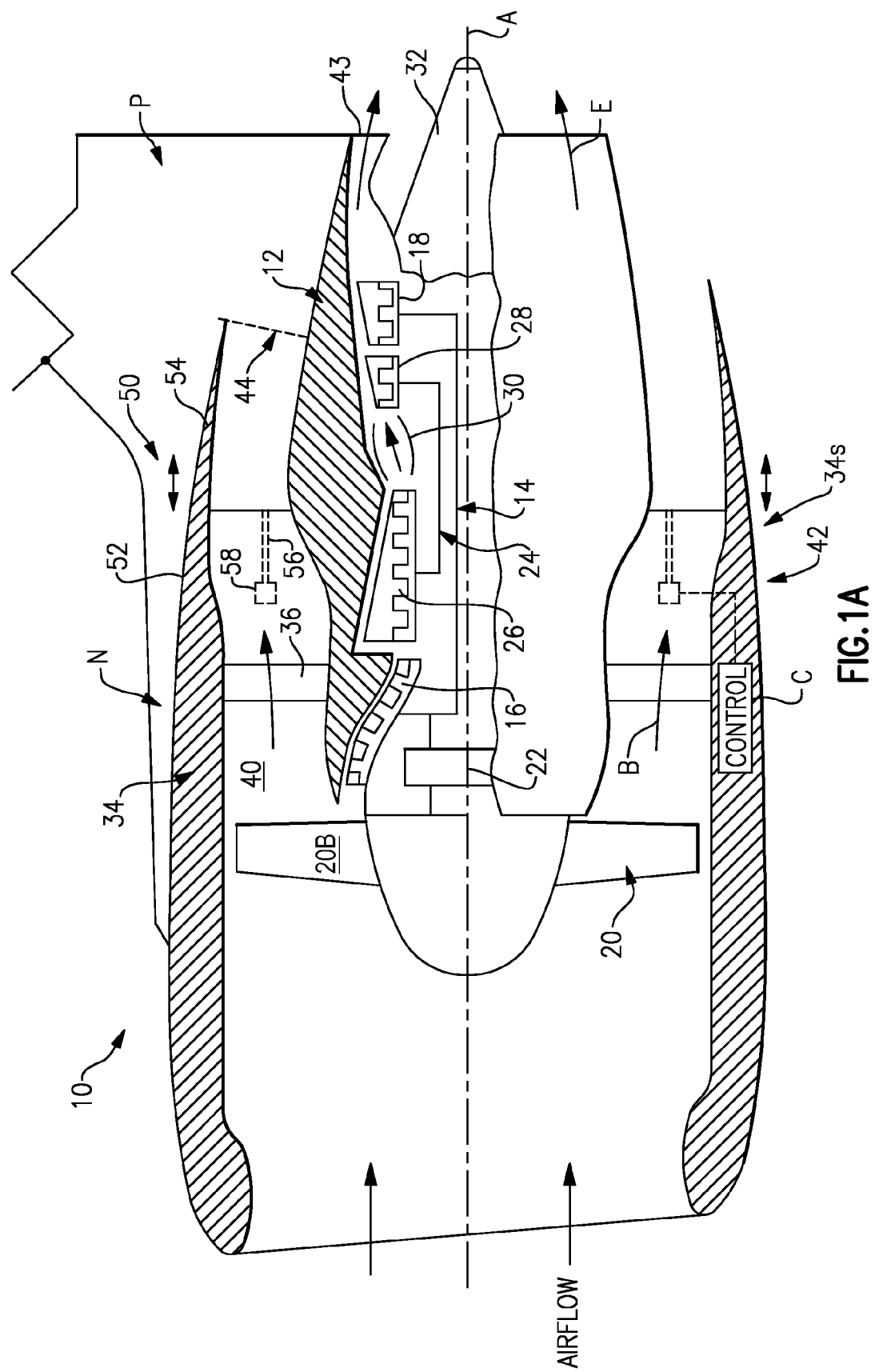
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared aircraft engine. In one disclosed, non-limiting embodiment, the engine 10 bypass ratio is greater than about six (6), with an example embodiment being greater than about ten (10), the gear train 22 is an epicyclic gear train such as a planetary gear system or other gear system with a gear reduction ratio of greater than about 2.3 and the low pressure turbine 18 has a pressure ratio that is greater than about 5. In one disclosed embodiment, the engine 10 bypass ratio is greater than about ten (10:1), the turbofan diameter is significantly larger than that of the low pressure compressor 16, and the low pressure turbine 18 has a pressure ratio that is greater than about 5:1. Low pressure turbine 18 pressure ratio is pressure measured prior to inlet of low pressure turbine 18 as related to the pressure at the outlet of the low pressure turbine 18 prior to exhaust nozzle. The gear train 22 may be an epicycle gear train such as a planetary gear system or other gear system with a gear reduction ratio of greater than about 2.5:1. It should be understood, however, that the above parameters are only exemplary of one embodiment of a geared architecture engine and that the present invention is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by structure 36 often generically referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular fan bypass flow path 40 and is discharged from the engine 10 through a fan variable area nozzle (VAFN) 42 which defines a fan nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The Variable Area Fan Nozzle ("VAFN") 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 may include twenty (20) or less fan blades 20B which is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without the Fan Exit Guide Vane ("FEGV") system 36. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7)^{\wedge}0.5]$. The "Low corrected fan tip speed" as disclosed herein according to one non-limiting embodiment is less than about 1150 ft/second.

As the fan blades 20B within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 1B:
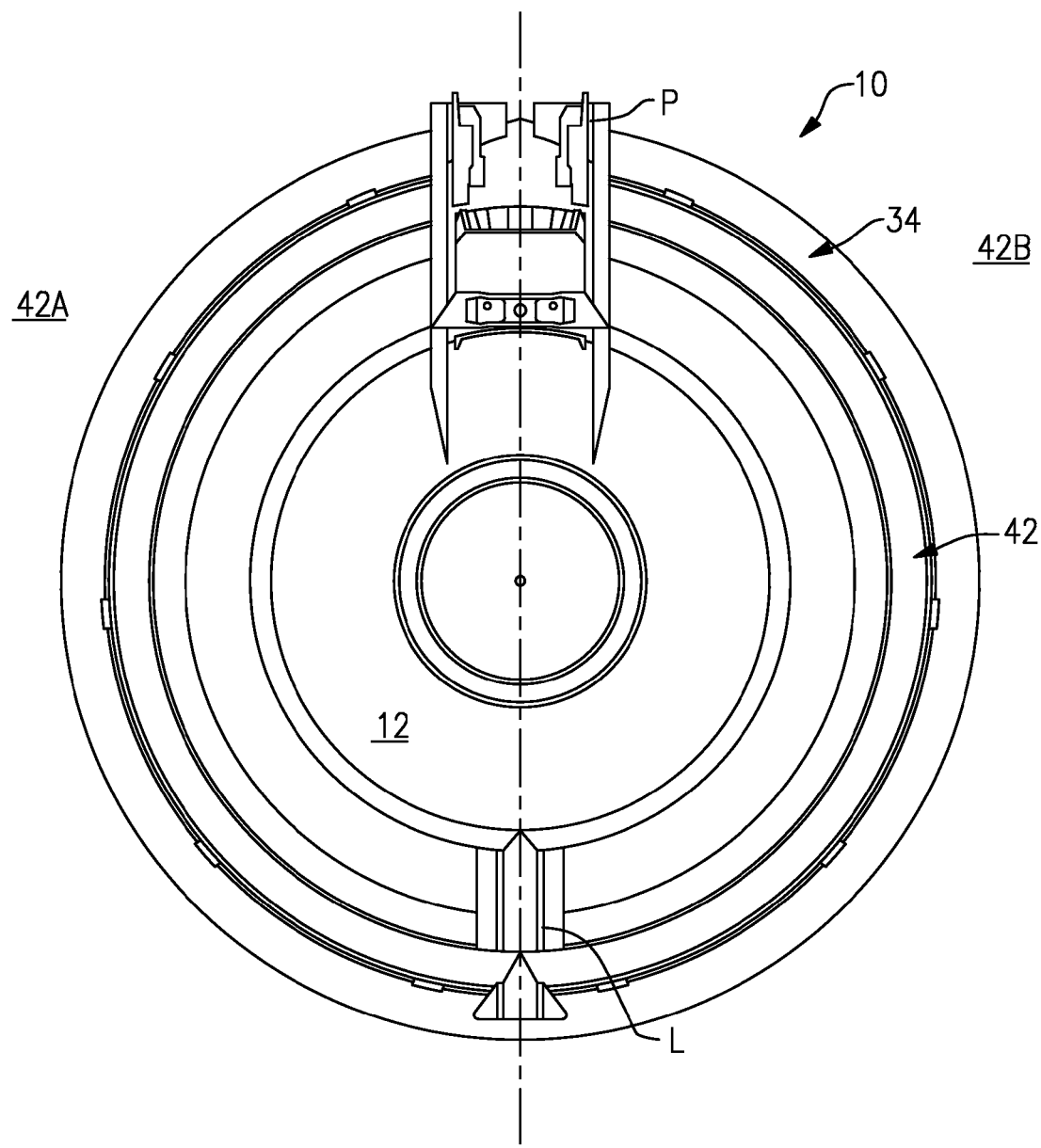
FIG. 1B is a rear view of the engine.

The VAFN 42 is separated into at least two sectors 42A-42B (FIG. 1B) defined between the pylon P and a lower Bi-Fi splitter L which typically interconnects a larger diameter fan duct reverser cowl and a smaller diameter core cowl (FIGS. 1C and 1D). Each of the at least two sectors 42A-42B are independently adjustable to asymmetrically vary the fan nozzle exit area 44 to generate vectored thrust. It should be understood that although two segments are illustrated, any number of segments may alternatively or additionally be provided.

In operation, the VAFN 42 communicates with a controller C or the like to adjust the fan nozzle exit area 44 in a symmetrical and asymmetrical manner. Other control systems including an engine controller or aircraft flight control system may also be usable with the present invention. By adjusting the entire periphery of the VAFN 42 symmetrically in which all sectors are moved uniformly, thrust efficiency and fuel economy are maximized during each flight condition. By separately adjusting the circumferential sectors 42A-42B of the VAFN 42 to provide an asymmetrical fan nozzle exit area 44, engine bypass flow is selectively vectored to provide, for example only, trim balance or thrust controlled maneuvering enhanced ground operations or short field performance.

The VAFN 42 generally includes an auxiliary port assembly 50 having a first fan nacelle section 52 and a second fan nacelle section 54 movably mounted relative the first fan nacelle section 52. The second fan nacelle section 54 axially slides along the engine axis A relative the fixed first fan nacelle section 52 to change the effective area of the fan nozzle exit area 44. The second fan nacelle section 54 slides aftward upon a track fairing 56A, 56B (illustrated schematically in FIGS. 1C and 1D) in response to an actuator 58 (illustrated schematically). The track fairing 56A, 56B extend from the first fan nacelle section 52 adjacent the respective pylon P and the lower Bi-Fi splitter L (FIG. 1D).

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 2A) and an open position (FIG. 2B). The auxiliary port assembly 50 is closed by positioning the second fan nacelle section 54 in-line with the first fan nacelle section 52 to define the fan nozzle exit area 44 as exit area F0 (FIG. 2A).

The VAFN 42 is opened by moving the second fan nacelle section 54 aftward along the track fairing 56A, 56B away from the first fan nacelle section 52 to open an auxiliary port 60 which extends between the open second fan nacelle section 54 relative the first fan nacelle section 52 to essentially provide an increased fan nozzle exit area 44 exit area F1. That is, the exit area F1 with the port 60 is greater than exit area F0 (FIG. 2B).

In one disclosed embodiment, the auxiliary port 60 is incorporated into the exhaust system of a high bypass ratio commercial turbofan engine within the bypass duct aft of the Fan Exit Guide Vanes (FEGVs; FIGS. 2A, 2B). The auxiliary port 60 is located in the aft section of the bypass duct outer wall.

Figure 3:
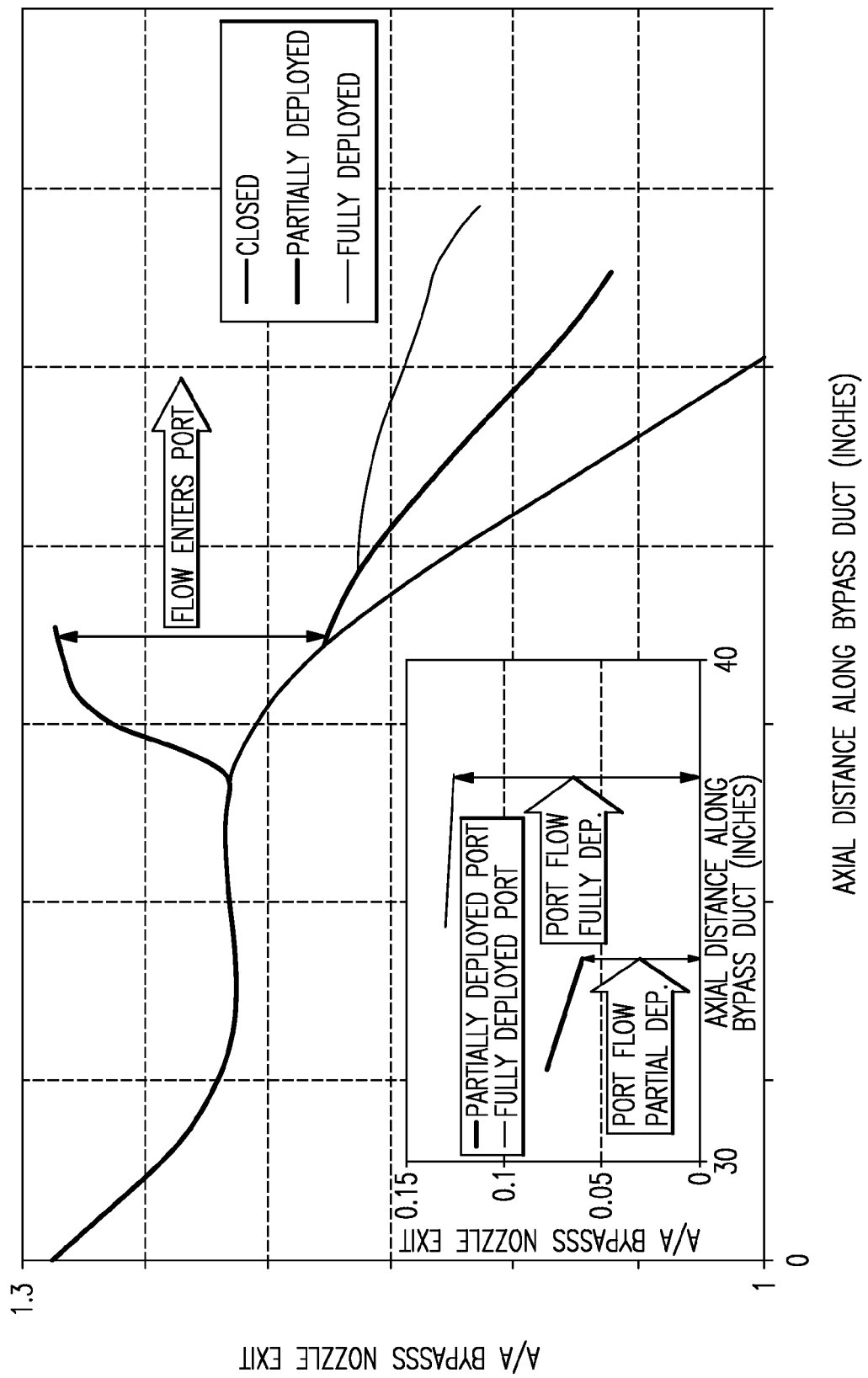
FIG. 3 is a graph of a bypass duct normalized cross-sectional area distribution.
Figure 4:
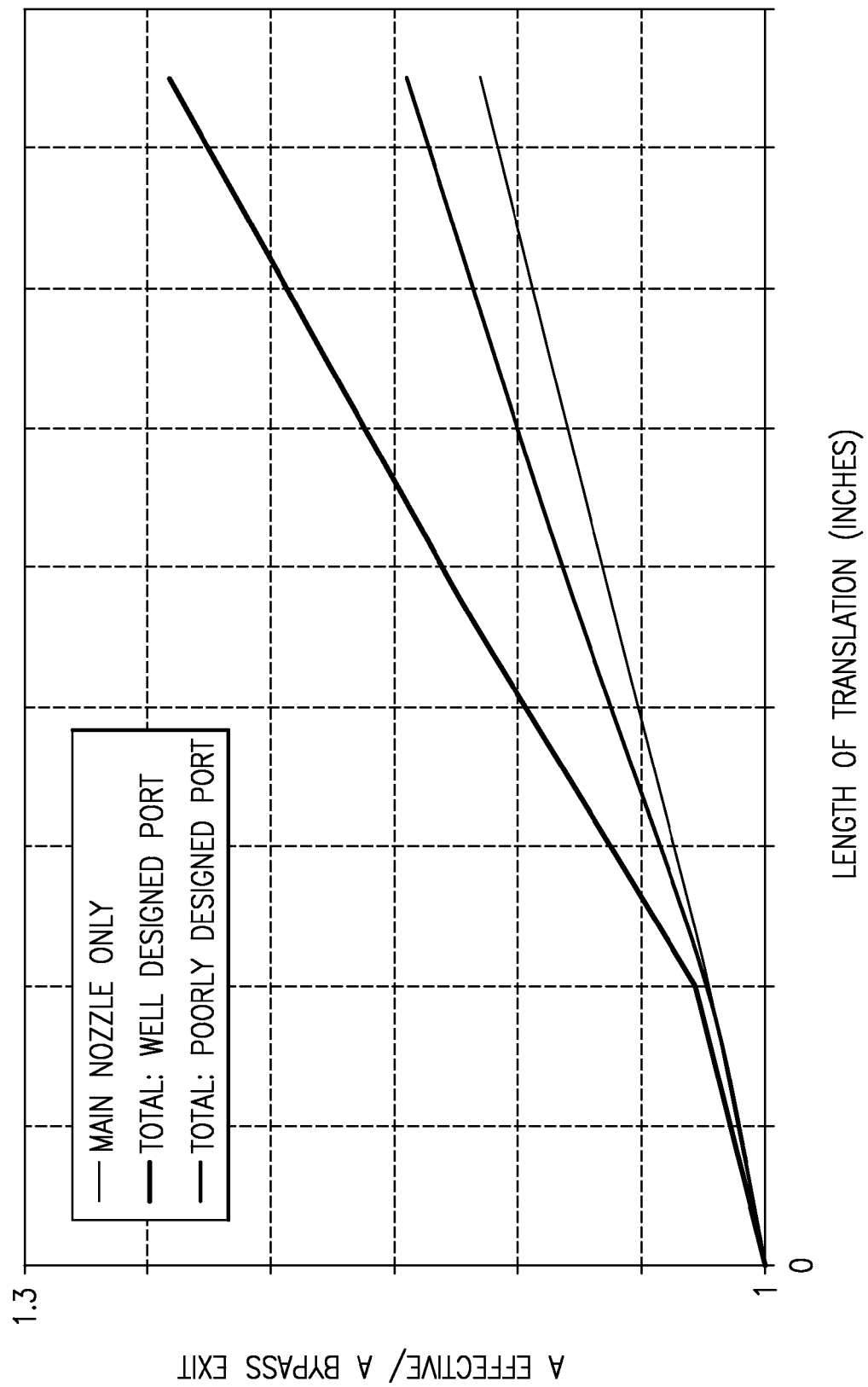
FIG. 4 is a graph of a Effective Area Increase vs. Nozzle Translation.

Referring to FIG. 3, the bypass duct area distribution, the effective area increase vs. translation (FIG. 4), area distribution (FIG. 5), and auxiliary port 60 location (FIG. 6A) and wall curvatures (FIG. 6B-6C) are tailored to provide a proper flow-field that allows the auxiliary port 60 to obtain the required additional effective exit area. The auxiliary port 60 will essentially double the effective area gain due to translation. The auxiliary port 60 provides a relatively low weight method of providing increased exit area to control the fan operating line without causing high system losses or unacceptable aircraft installation issues. By tailoring the bypass duct area distribution and outer wall curvature, the desired maximum effective area increase is achieved before the stroke of the auxiliary port 60 reaches its effective area increase limit.

The auxiliary port exit plane 44B (defined as the plane between the stationary section's trailing edge and the moving sections leading edge) initially has an opening in which the exit plane normal vector is near-axial, but as the stroke increases, the normal vector becomes more inclined and approaches a near-radial vector. Once the exit plane normal has become near-radial, the maximum auxiliary port effectiveness has been reached. Once this point is reached, the rate of the effective area vs. translation changes from steep slope of the "well designed port" the shallow rate of the "main nozzle only", since additional area will be provided through the main nozzle 44A due to the inward slope of the core nacelle 12. A well designed auxiliary port nozzle will achieve approximately +25% effective area before the port effectiveness limit is reached. That is, there is a limited range of stroke in which the auxiliary port doubles the rate of additional effectiveness. Outside of this range, the rate of additional effectiveness may be equivalent to a translating nozzle that has no auxiliary port. Or put another way, the auxiliary port reduces the stroke necessary for a pure translating nozzle to achieve a desired effective area.

Figure 5:
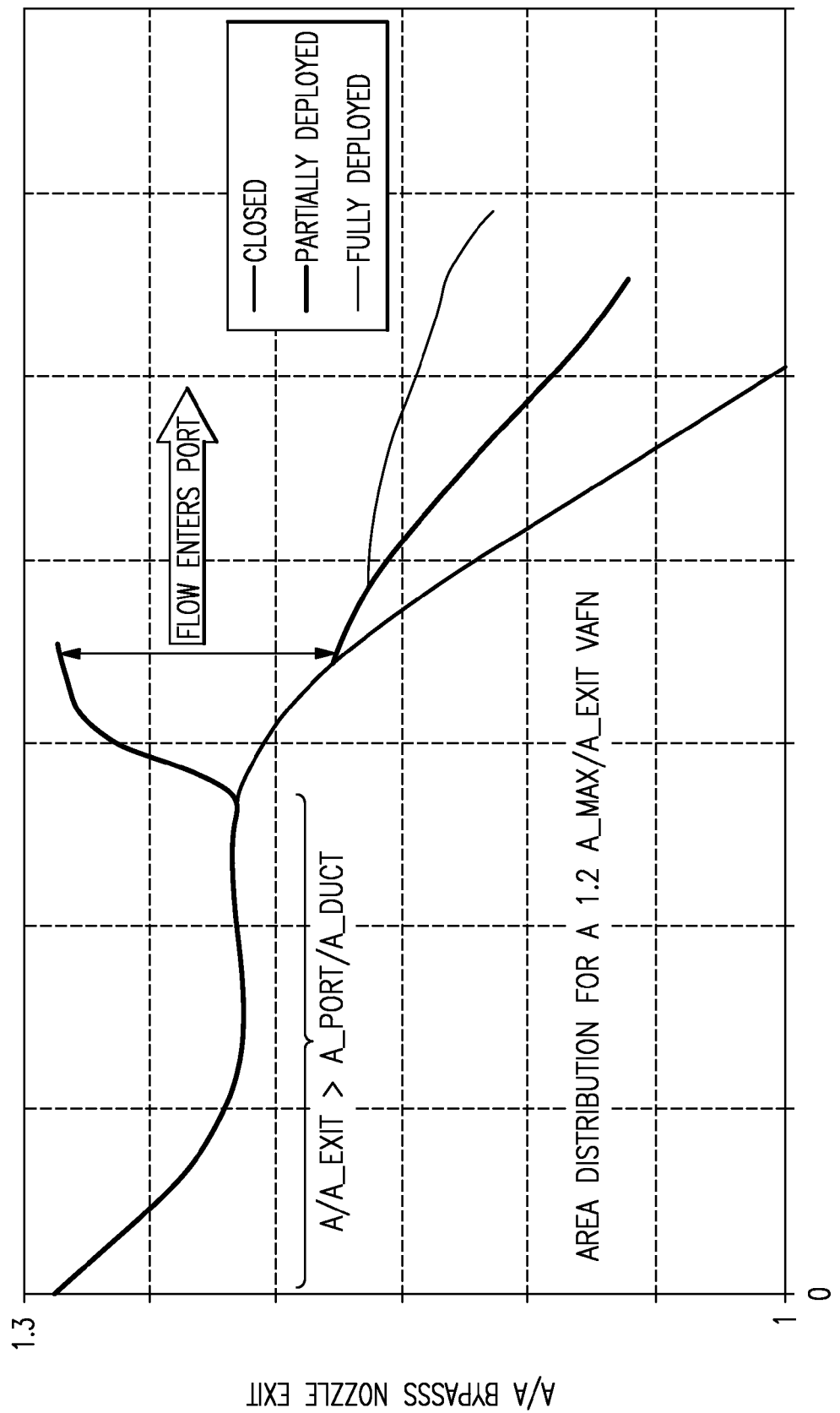
FIG. 5 is a graph of a duct area distribution.

Referring to FIG. 5, the cross-sectional area at the auxiliary port 60 is greater than the maximum required effective area of the VAFN 42 and the bypass duct area distribution is tailored to ensure the duct cross-sectional area forward of the auxiliary port 60 is greater than the port opening cross-sectional area. This avoids a situation where an upstream internal cross-section becomes the controlling flow area (i.e. is smaller than the exit area), which can lead to operational limits and structural issues.

Figure 6A:
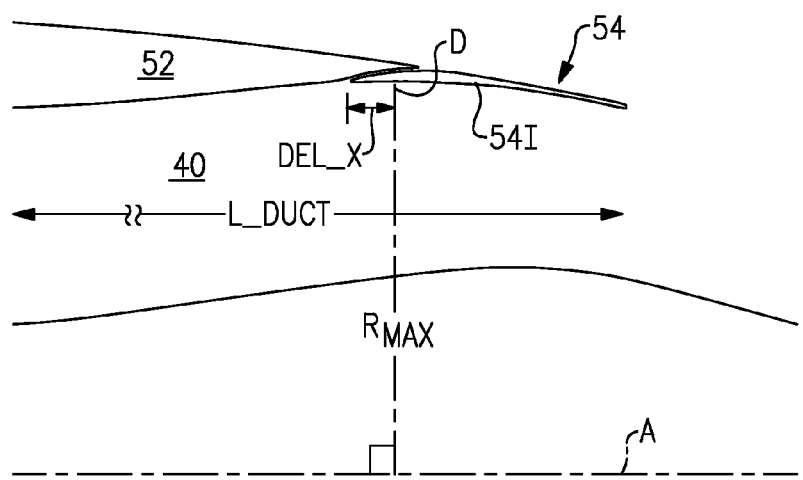
FIG. 6A is schematic geometric view of the auxiliary port location.
Figure 6B:
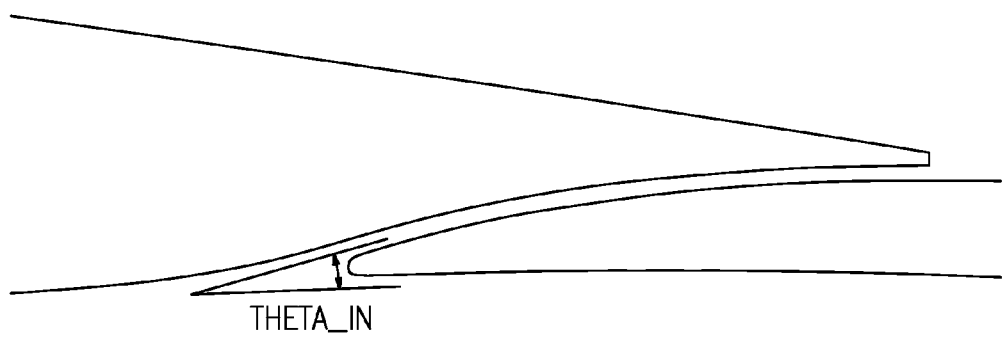
FIG. 6B is schematic geometric view of the auxiliary port entrance angle.
Figure 6C:
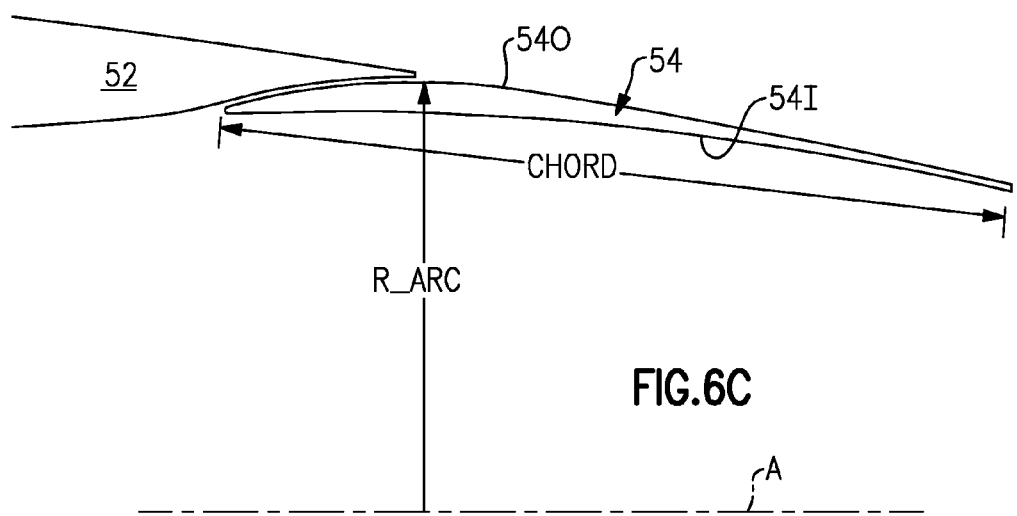
FIG. 6C is schematic geometric view of a VAFN outer surface curvature.

Referring to FIG. 6A, the auxiliary port 60 in the disclosed embodiment, is located no more forward than 0.1 DEL_X/L_DUCT defined from a point D at the largest radius Rmax of the annular fan bypass flow path 40 defined by the second fan nacelle section 54. Rmax is defined through point D and perpendicular to the engine axis A. Point D in the disclosed non limiting embodiment is located on an inner wall surface 54I of the second fan nacelle section 54 when the second fan nacelle section 54 is in a closed position. DEL_X is the axial distance to the forward most point of the auxiliary port 60 from Rmax. L_DUCT is the overall axial length of the annular fan bypass flow path 40. The angle between the mean port line and the fan duct outer wall is relatively low to provide well-behaved, low loss exit flow. In the disclosed embodiment, the auxiliary port 60 entrance angle (Theta_in) relative to the fan bypass duct OD wall, is less than 20 degrees (FIG. 6B) while the outer VAFN surface has an R_ARC/CHORD>0.7 where R_ARC is a radial distance from the engine axis A to a radial outer wall surface 54O of the second fan nacelle section 54 and CHORD is the chord length of the second fan nacelle section 54. (FIG. 6C). The curvature of the outer wall surface 54O near the auxiliary port 60 promotes flow through the auxiliary port 60. In one disclosed embodiment, the stroke of the second fan nacelle section 54 necessary to obtain an additional 20% effective exit area is approximately 8.4 inches.

In operation, the VAFN 42 communicates with the controller C to move the second fan nacelle section 54 relative the first fan nacelle section 52 of the auxiliary port assembly 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
   a core nacelle defined about an engine centerline axis;
   a core engine at least partially disposed within the core nacelle;
   a fan section with twenty (20) or less fan blades;
   a gear system driven by the core engine to drive said fan section;
   a fan nacelle mounted at least partially around said fan section and said core nacelle to define a fan bypass flow path for a fan bypass airflow, said fan section having a fan pressure ratio less than 1.45;
   a variable fan nozzle axially movable relative to the fan nacelle, the variable fan nozzle includes an auxiliary port defining an opening between a first nacelle section and a second nacelle section, the auxiliary port defines a flow area for increasing bypass flow at a desired opening position of the second nacelle section relative to the first nacelle section, and an entrance angle into the auxiliary port relative to a radially outer wall of the fan nacelle defining the bypass flow path is less than 20 degrees; and
   a controller for independently adjusting a position of the second section relative to the first section.

2. The engine as recited in claim 1, wherein the controller is operable to reduce said fan nozzle exit area at a cruise flight condition.

3. The engine as recited in claim 1, wherein said controller is operable to control said fan nozzle exit area to reduce a fan instability.

4. The engine as recited in claim 1, wherein said fan variable area nozzle defines a trailing edge of said fan nacelle.

5. The engine as recited in claim 1, wherein said fan section defines a corrected fan tip speed less than 1150 ft/second.

6. The engine as recited in claim 1, wherein said core engine includes a low pressure turbine which defines a low pressure turbine pressure ratio that is greater than five (5).

7. The engine as recited in claim 1, wherein the gear system defines a gear reduction ratio of greater than or equal to 2.3.

8. The engine as recited in claim 1, wherein said gear system defines a gear reduction ratio of greater than or equal to 2.5.

9. The engine as recited in claim 1, wherein said fan bypass airflow defines a bypass ratio greater than six (6).

10. The engine as recited in claim 1, wherein said fan bypass airflow defines a bypass ratio greater than ten (10).

11. The engine as recited in claim 1, wherein the second nacelle section includes a first sector defined between a pylon and a lower Bi-Fi within the bypass flow path and a second sector defined between the pylon and the lower Bi-Fi on a side opposite the engine centerline axis from the first sector.

12. The engine as recited in claim 11, wherein the opening defined by the auxiliary port is a semi-annular opening between the at least two sectors and the fan nacelle.

13. The engine as recited in claim 11, wherein the at least two sectors are independently adjustable to vary a fan exit nozzle asymmetrically to generate a vectored thrust.

* * * * *

UNITED STATES PATENT AND TRADEMARK OFFICE
CERTIFICATE OF CORRECTION

PATENT NO. : 9,494,084 B2
APPLICATION NO. : 13/340810
DATED : November 15, 2016
INVENTOR(S) : Gregory A. Kohlenberg et al.

It is certified that error appears in the above-identified patent and that said Letters Patent is hereby corrected as shown below:

In the Claims

In Claim 2, Column 8, Line 2; after "reduce" replace "said" with --a--

In Claim 2, Column 8, Line 5; after "control" replace "said" with --a--

In Claim 4, Column 8, Line 7; after "wherein" replace "said" with --a--

In Claim 12, Column 8, Line 34; after "between" delete "the"

In Claim 13, Column 8, Line 35; after "wherein" delete "the"

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*